United States Patent [19]

Melo et al.

[11] Patent Number: 5,471,590
[45] Date of Patent: Nov. 28, 1995

[54] BUS MASTER ARBITRATION CIRCUITRY HAVING IMPROVED PRIORITIZATION

[75] Inventors: Maria L. Melo, Houston; Randy M. Bonella, Cypress, both of Tex.

[73] Assignee: Compaq Computer Corp., Houston, Tex.

[21] Appl. No.: 188,456

[22] Filed: Jan. 28, 1994

[51] Int. Cl.[6] .................................................. G06F 13/36
[52] U.S. Cl. ..................... 395/288; 340/825.5; 370/85.6; 364/240; 364/242.6; 364/242.92; 364/230; 364/230.4; 364/240.1; 364/DIG. 1; 395/299
[58] Field of Search ................................... 395/325, 725, 395/650, 425; 370/85.6; 340/825.5

[56] References Cited

U.S. PATENT DOCUMENTS

| | | | |
|---|---|---|---|
| 4,574,350 | 3/1986 | Starr | 395/725 |
| 4,602,327 | 7/1986 | LaViolette et al. | 395/325 |
| 4,663,756 | 5/1987 | Retterath | 370/85.6 |
| 4,706,190 | 11/1987 | Bomba et al. | 395/325 |
| 4,755,938 | 7/1988 | Takahashi et al. | 395/725 |
| 4,858,116 | 8/1989 | Gillett, Jr. et al. | 395/325 |
| 4,980,854 | 12/1990 | Donaldson et al. | 395/325 |
| 4,987,529 | 1/1991 | Craft et al. | 395/325 |
| 5,067,071 | 11/1991 | Schanin et al. | 395/275 |
| 5,127,089 | 6/1992 | Gay et al. | 395/325 |
| 5,167,022 | 11/1992 | Bahr et al. | 395/325 |
| 5,265,223 | 11/1993 | Brockmann et al. | 395/325 |
| 5,339,443 | 8/1994 | Lockwood | 395/725 |
| 5,341,510 | 8/1994 | Gillett, Jr. et al. | 395/800 |

FOREIGN PATENT DOCUMENTS

| | | | |
|---|---|---|---|
| 0432978A2 | 6/1991 | European Pat. Off. | G06F 13/30 |
| WO88/02150 | 3/1988 | WIPO | G06F 13/36 |

OTHER PUBLICATIONS

82420/82430 PCI Set, ISA and EISA Bridges, Intel Corp., pp. 3–5, 17, 35, 37, 148, 154–157, 172–174, 211, 225–226, 293–302, 320–321, 345, 363–364, 438–444, 460–462 (1993).

*Primary Examiner*—Gopal C. Ray
*Attorney, Agent, or Firm*—Pravel, Hewitt, Kimball & Krieger

[57] ABSTRACT

An arbiter which allows retried requests to have high priority in subsequent arbitrations by not changing priority on a granted, but aborted, access to the bus and yet prevents the aborted requestor from thrashing the bus by masking its bus request signal until the data is available. Further, should an access to main memory be retried, all bus requests except the one from the memory system are masked to provide the memory system the highest effective priority to allow any flushing operations to occur. The masking of the various bus requests allows the arbiter to control access to a PCI standard bus without requiring that specific signals be added. The arbiter further includes modified priority LRU techniques and provides a locking requestor with an additional, highest priority position if retried.

9 Claims, 13 Drawing Sheets

BUS MASTER ARBITRATION CIRCUITRY HAVING IMPROVED PRIORITIZATION

BACKGROUND OF THE INVENTION

1. Field of the Invention

The invention relates to bus arbitration protocols, and particularly to a protocol on a bus where cycles can be aborted and retried.

2. Description of the Related Art

The performance demands on personal computers are ever increasing. It has been determined that a major bottleneck in improving performance is the capability to perform input/output (I/O) operations. Processor speeds continue to increase at a great rate and memory speeds and architectures can partially keep pace. However, the speed of I/O operations, such as disk and local area network (LAN) operations, has not kept pace. The increasing complexity of video graphics used in personal computers is also demanding greater performance then can be conventionally provided.

Some of the problems were in the bus architecture used in IBM PC-compatible computers. The EISA architecture provided some improvement over the ISA architecture of the IBM PC/AT, but more performance was still required. To this end Intel Corporation, primarily, developed the Peripheral Component Interconnect (PCI) bus. The PCI bus is a mezzanine bus between the host or local bus in the computer, to which the processor and memory are connected, and the I/O bus, such as ISA or EISA. For more details on the PCI bus, reference to the PCI Standard Version 2.0, from the PCI Special Interest Group in care of Intel Corp., which is hereby incorporated by reference, is advised. The bus was designed to have a high throughput and to take advantage of the increasing number of local processors that support I/O functions. For example, most disk controllers, particularly SCSI controllers, and network interface cards (NICs) include a local processor to relieve demands on the host processor. Similarly, video graphics boards often include intelligent graphics accelerators to allow higher level function transfer. Typically these devices have the capability of operating as bus masters, to allow them to transfer data at the highest possible rates.

Because of the number of potential devices trying to be bus masters, an arbitration scheme is required. A common arbitration scheme is least-recently-used (LRU). In certain cases, such as described in Application Serial No. 07/955,499, entitled Prioritization of Microprocessors in Multiprocessor Computer Systems, filed on Oct. 2, 1992, which is hereby incorporated by reference, the LRU scheme is modified so that the LRU of just the various requestors is utilized. This avoids potential deadlock conditions.

According to the PCI standard, responding devices may abort a cycle, causing the requesting device to retry the operation at a later time. This is desirable where numerous bus masters are present, as the bus is not held essentially inactive while waiting to gain control of another bus. By aborting the operation, other bus masters can gain access to the bus and perform operations, thus reducing the degradation of overall system performance. But if the responding device becomes available to complete the operation, it would be advantageous to allow the aborted requestor to gain quick control of this bus. Such a condition was present in the arbitration described in the above-referenced patent application, which system did not use the PCI standard. If a host bus master attempted to perform a locked cycle to the EISA bus and the EISA bus was busy, a reservation bit identifying the aborted requestor was set so that when the bus master next tried to access the bus on its retry operation and the EISA bus was available, the normal arbitration prioritization was overridden and the bus master having the reservation bit became the next bus master. This reservation technique was necessary as the aborted bus master become the most recently used and thus went to the bottom of the priority schedule.

To prevent the bus master from repeatedly requesting the bus and then being aborted, a signal was present on the bus so that the bus master did not request the bus until it could perform the locked cycle. However, the PCI standard does not make provision for this additional signal, so the techniques could not be readily utilized. Should a similar reservation technique be utilized with a PCI bus, thrashing of the bus by the high priority bus master could result, thus actually reducing system performance. A solution to resolve the problems of both a retried bus master becoming the lowest priority and of thrashing the bus when retrying is desirable in a PCI system.

Further, write posting buffers are commonly utilized to allow a write operation to be captured and performed as time permits, but the bus master is released to commence the next operation. In certain PCI designs the memory system utilizes such posting buffers. If the memory system is busy or the posting buffers must be flushed to main memory, the bus master's cycle may be aborted. If the main memory system were to have a low priority, the flush operation might be delayed until the main memory becomes the natural winner of a bus arbitration. However, this wait would also have delayed operation of the retrying bus master, as it must wait for the main memory to obtain priority. This increased delay reduces system performance, so a solution to this problem is desirable, allowing an increase in performance.

Thus, while the PCI bus is an improvement over prior buses, certain reduced performance conditions are present and their resolution is advantageous.

SUMMARY OF THE INVENTION

An arbiter according to the present invention allows retried requests to have high priority in subsequent arbitrations by not changing priority on a granted, but aborted, access to the bus and yet prevents the aborted requestor from thrashing the bus by masking its bus request signal until the bus is available in certain cases. Further, should an access to main memory be retried, all bus requests except the one from the memory system are masked to provide the memory system the highest effective priority to allow any flushing operations to occur. This high priority for flushing, in combination with not reprioritizing because of the retry, allows the retried requestor prompt access back to the memory, thus increasing system performance. The masking of the various bus requests allows the arbiter to control access to a PCI standard bus without requiring that specific signals be added.

The arbiter further includes the modified priority LRU techniques discussed above and provides a locking requestor with an additional, highest priority position if retried. As a result, the arbiter provides a high performance solution to arbitration of a PCI bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
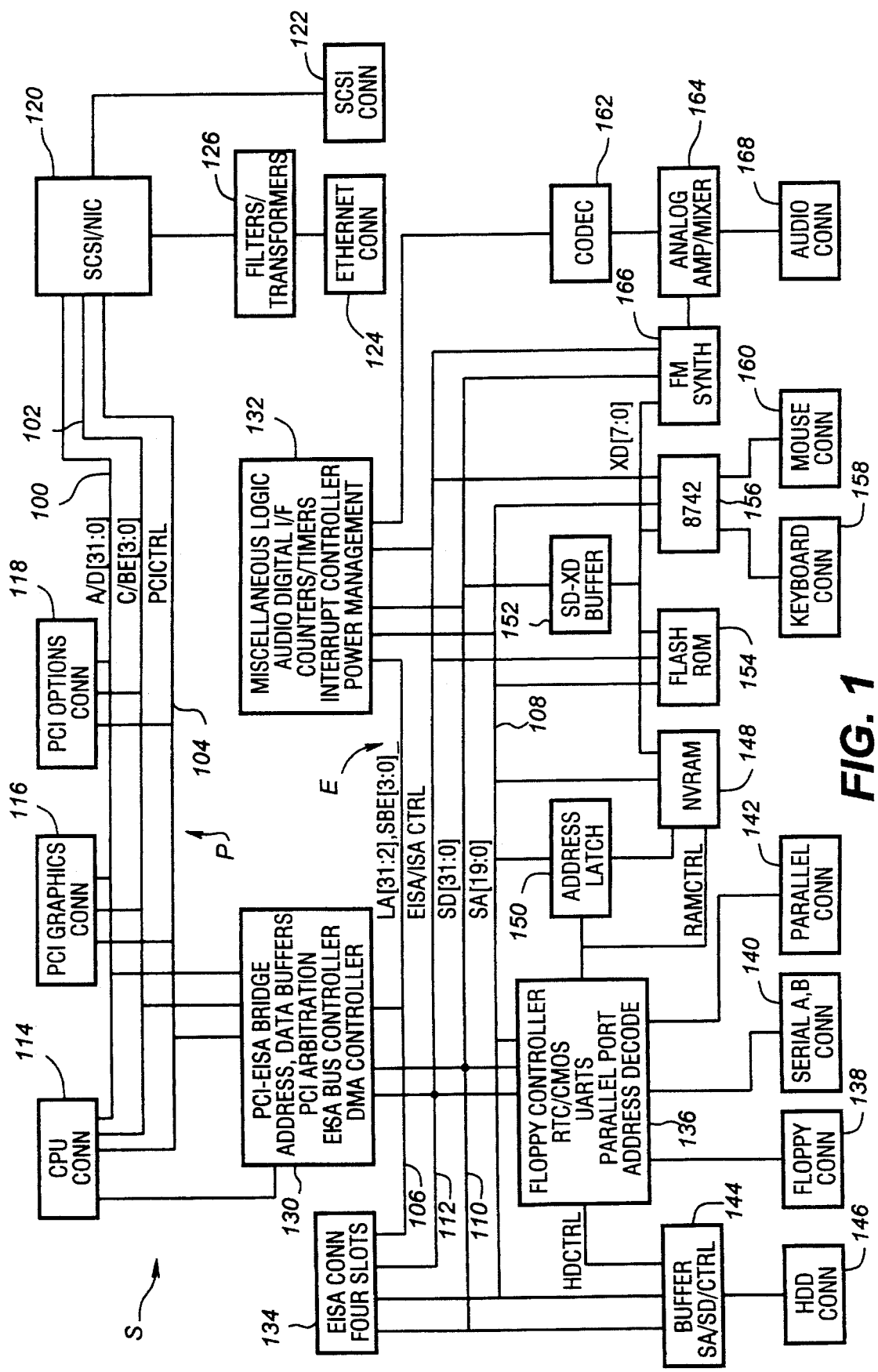
FIG. 1 is a block diagram of a system board including an arbiter according to the present invention.

Referring now to FIG. 1, the system board S of a computer system according to the present invention is shown. In the preferred embodiment, the system board contains circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2A:
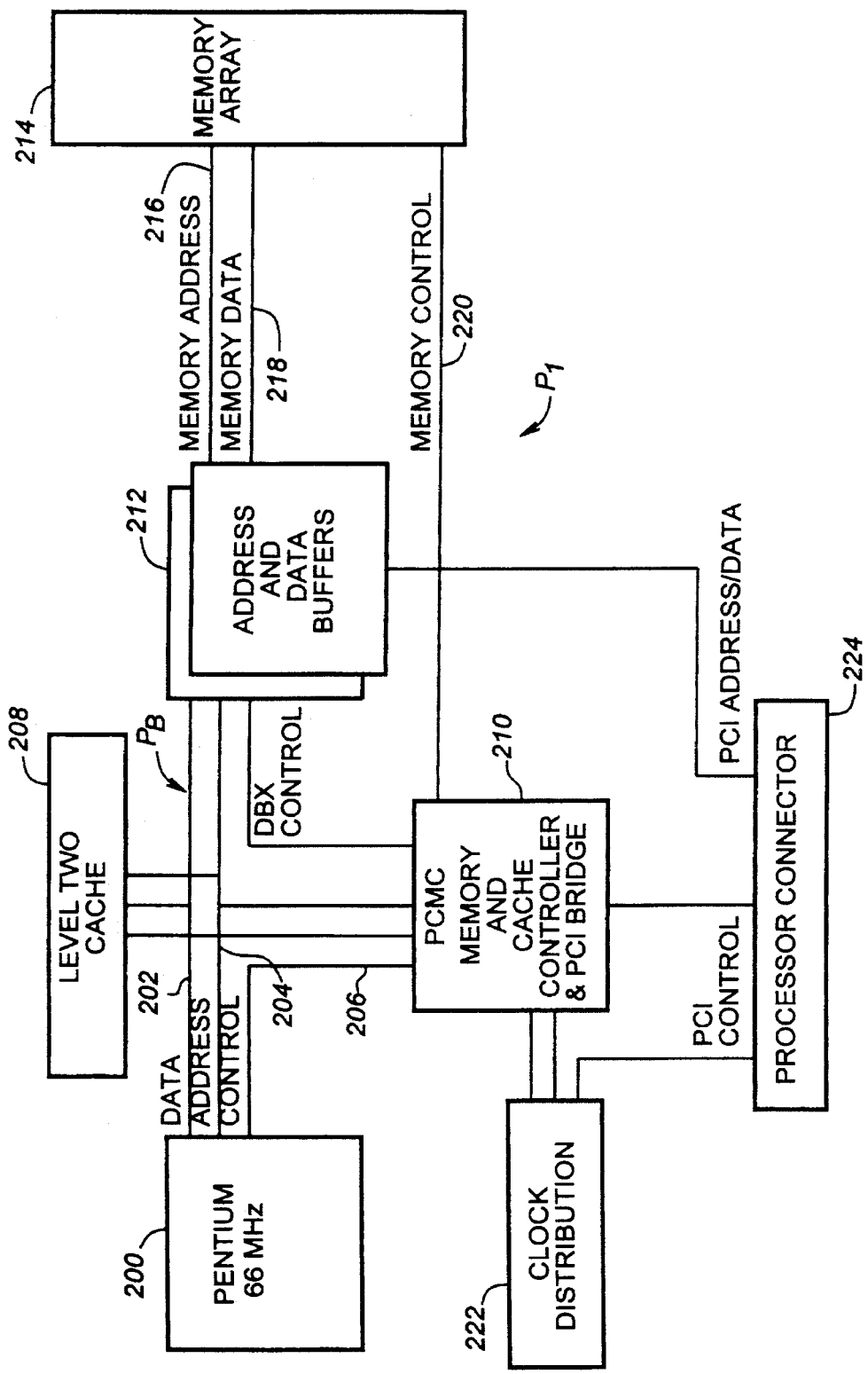
FIGS. 2A and 2B are block diagrams of alternate processor boards for use with the system board of FIG. 1.
Figure 2B:
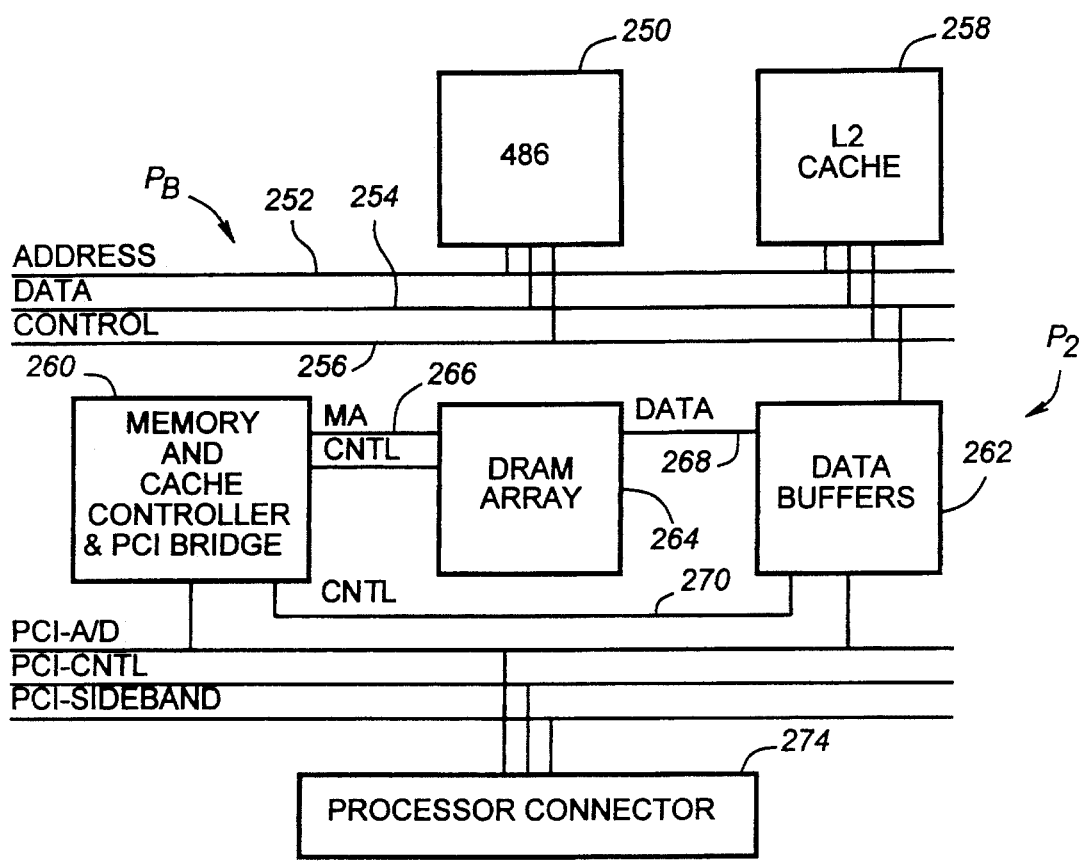
Figure 3:
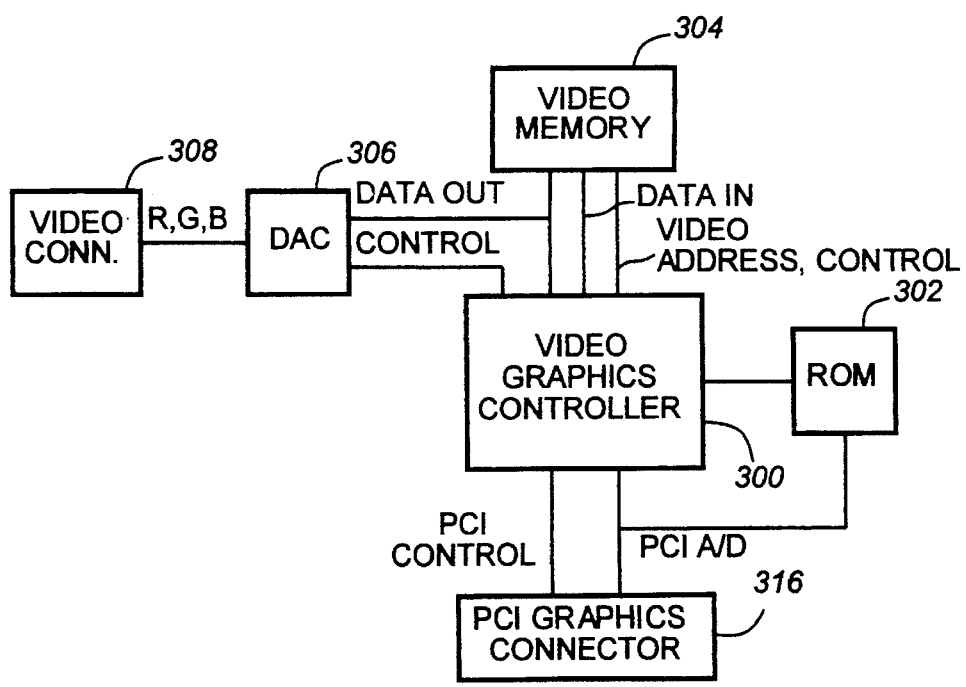
FIG. 3 is a block diagram of a video graphics controller board for use with the system board of FIG. 1.

A CPU connector 114 is connected to the PCI bus P to receive interchangeable processor cards, such as those shown in FIGS. 2A and 2B. A PCI graphics connector 116 is connected to the PCI bus P to receive a video graphics card as shown in FIG. 3. A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIGS. 2A and 2B, alternate processor board designs are shown. In the processor board P1 of FIG. 2A, the CPU or processor 200 is the Pentium processor from Intel, preferably operating at 66 MHz. The processor 200 provides data, address and control portions 202, 204 and 206 to form a processor bus PB. A level 2 (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212. The address and data buffers 212 are preferably the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P1 and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 2B, an alternate processor card P2 is shown. In the processor card P2, the processor 250 is preferably a 486 class processor, such as the 486 S-class processors. Again, address, data and control portions 252, 254 and 256 are developed from the processor 250 to form a processor bus PB. An L2 cache memory 258 is connected to the processor bus PB, while a cache and memory controller and PCI bridge chip (CDC) 210, such as the 82424TX from Intel, is also connected to the processor bus PB. The CDC 210 controls the operations of the L2 cache 258, as similarly performed in processor card P1 by the PCMC 210. A main memory array 264 receives its address information directly from the CDC 260, as well as its control signals. Data buffers 262, preferably the 82423TX from Intel, are connected between the processor data portion 254 and a data bus 268 to the memory array 264. The data buffers 262 are controlled by the CDC 260. Again, a processor connector 274 is provided to be mateably received with the processor connector 114. The CDC 260 is connected to the processor connector 274, as are the data buffers 262.

Referring now to FIG. 3, an exemplary video graphics adapter is shown. A video graphics controller 300 is connected to a PCI graphics connector 316, which is mateably received in the graphics connector 116. A ROM 302 is connected to the graphics connector 316 and receives control signals from the video graphics controller 300. Video memory 304 is used to store the graphics data and is connected to the video graphics controller 300 and a digital/analog converter (DAC) 306. The video graphics controller 300 controls the operation of the video memory 304, allowing data to be written and retrieved as required. A video connector 308 is connected to the DAC 306. A monitor (not shown) is connected to the video connector 308.

It is noted that the above description of a computer system is provided for completeness and numerous variations could be developed as apparent to those skilled in the art.

Figure 4:
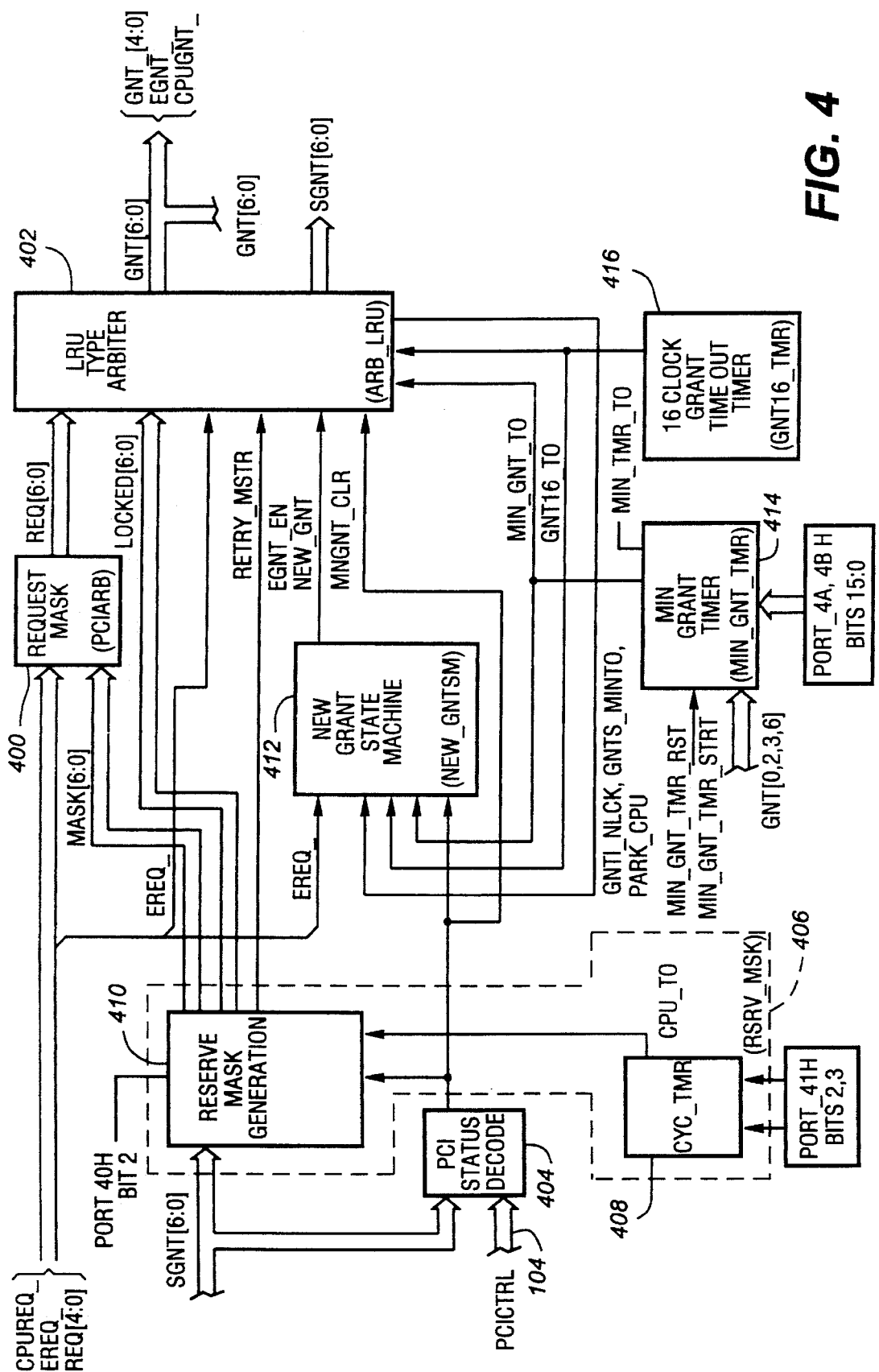
FIG. 4 is a block diagram of the PCI arbiter of FIG. 1.

Referring now to FIG. 4, the arbiter included in the PCI-EISA bridge 130 is illustrated. Six request signals, CPUREQ_, EREQ_ and REQ_[4:0] are provided to request mask logic 400. In this description a signal mnemonic ending in an underline indicates that it is an active low signal, while an exclamation point indicates an inverted signal. In the embodiment of the system board S shown in FIG. 1, it is understood that one of the REQ_[4:0] signals are not utilized. Thus expansion capability is provided for future systems. The request mask logic 400 produces the REQ[6:0] signals to a modified true LRU arbiter 402. For the remainder of this description the CPU receives the [0] designation, the EISA bus E receives the [1] designation, the option connector 118 receives the [2] designation, the graphics connector 116 receives the [3] designation and the SCSI/NIC controller 120 receives the [4] and [5] designations, with [6] being unused. The output of the arbiter 402 is a series of signals referred to as the GNT[6:0] and SGNT[6:0] signals. The GNT signals are used to develop the CPUGNT_, EGNT_ and GNT_[4:0] signals which are respectively the responses to the request signals provided to the request mask logic 400. The SGNT signals are the synchronized versions of the GNT signals, that is, they have been latched by a series of D-type flip-flops clocked on the PCICLK signal of the PCI bus P. The SGNT signals are provided to PCI status decode logic 404, which also receives the PCI control signals 104. Miscellaneous PCI cycle status signals are provided by the status decode logic 404. The SGNT signals are also provided to reservation and mask logic generally referred to as 406. As illustrated, the reservation and mask logic 406 includes two portions, a cycle timer 408, which receives two bits from an arbitrary I/O port, and reservation and mask generation logic 410, which receives one bit from an arbitrary I/O port. The output of the reservation and mask generation logic 410 is seven signals referred to as the MASK[6:0] signals, the priority masking signals, and seven signals referred to as the LOCKED[6:0] signals, which indicate which particular PCI bus master has locked the PCI bus P. Additionally, a signal referred to as RETRY_MSTR or retry master is provided to indicate that a master has been aborted and a retry cycle has occurred.

The MASK signals are provided to the request mask logic 400, while the LOCKED signals and the RETRY_MSTR signal are provided to the arbiter logic 402. In addition, the arbiter logic 402 receives the EREQ_ signal to determine if an EISA bus request is active. The EREQ_ signal is also provided to a new grant state machine 412, which is utilized to indicate when a new master can be granted control of the PCI bus P. Certain timers are associated with the grant phase, including the minimum grant timer 414 and a grant timeout timer 416. Sixteen bits of I/O from arbitrary ports are connected to the minimum grant timer 414, which also receives the GNT[0, 2, 3, 6] signals and signals referred to as MIN_GNT_TMR_STRT and MIN_GNT_TMR_RST or minimum grant timer start and reset signals. The minimum grant timer 414 produces two output signals referred to as the MIN_TMR_TO signal and the MIN_GNT_TO signals. Both of the signals indicate that the minimum grant timer 414 has timed out and that a new grant can occur. The output of the grant timeout timer 416 is the GNT16_TO signal and is provided to indicate that an arbitration should occur as a sufficient period has elapsed without a new bus master starting activity. In addition, the arbiter logic 402 produces various signals referred to as the GNT1_NLCK, GNTS_MINTO and PARK_CPU signals to the new grant state machine 412 for reasons to be detailed below. The various blocks are detailed in the following description.

Figure 5:
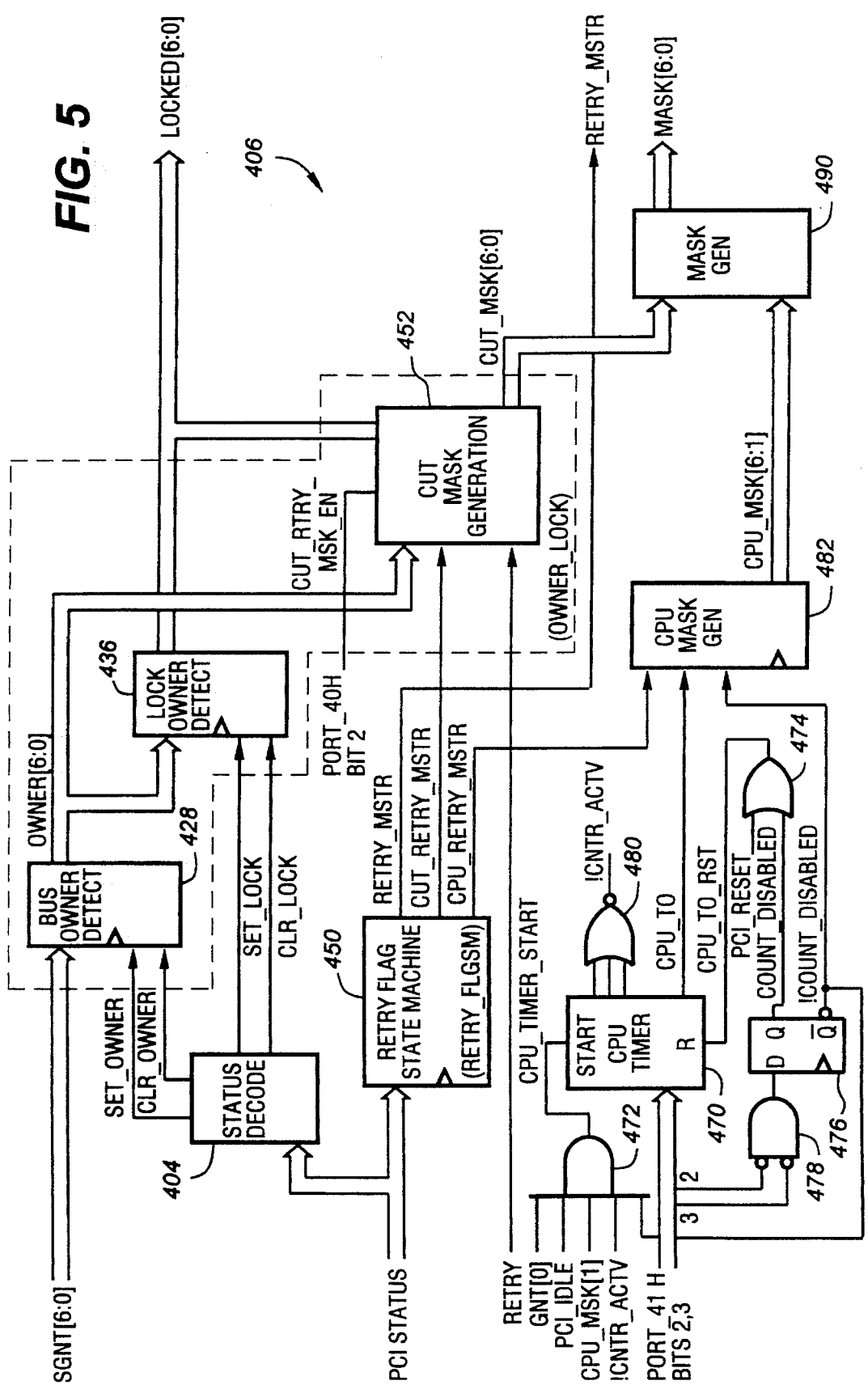
FIG. 5 is a block diagram of the reservation and masking logic of the PCI arbiter of FIG. 4.
Figure 6:
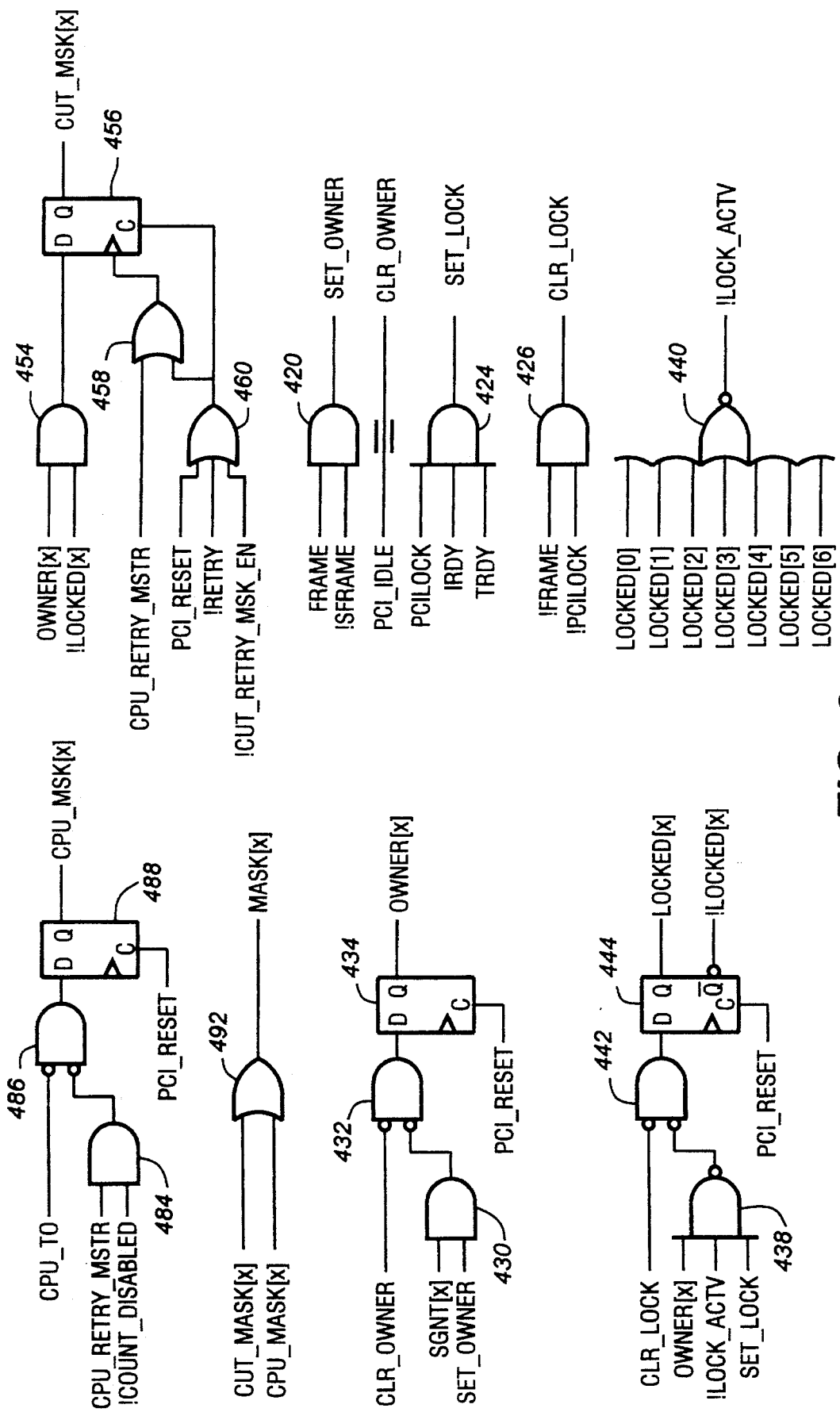
FIG. 6 is a schematic diagram of logic associated with the reservation and masking logic of FIG. 5.
Figure 14:
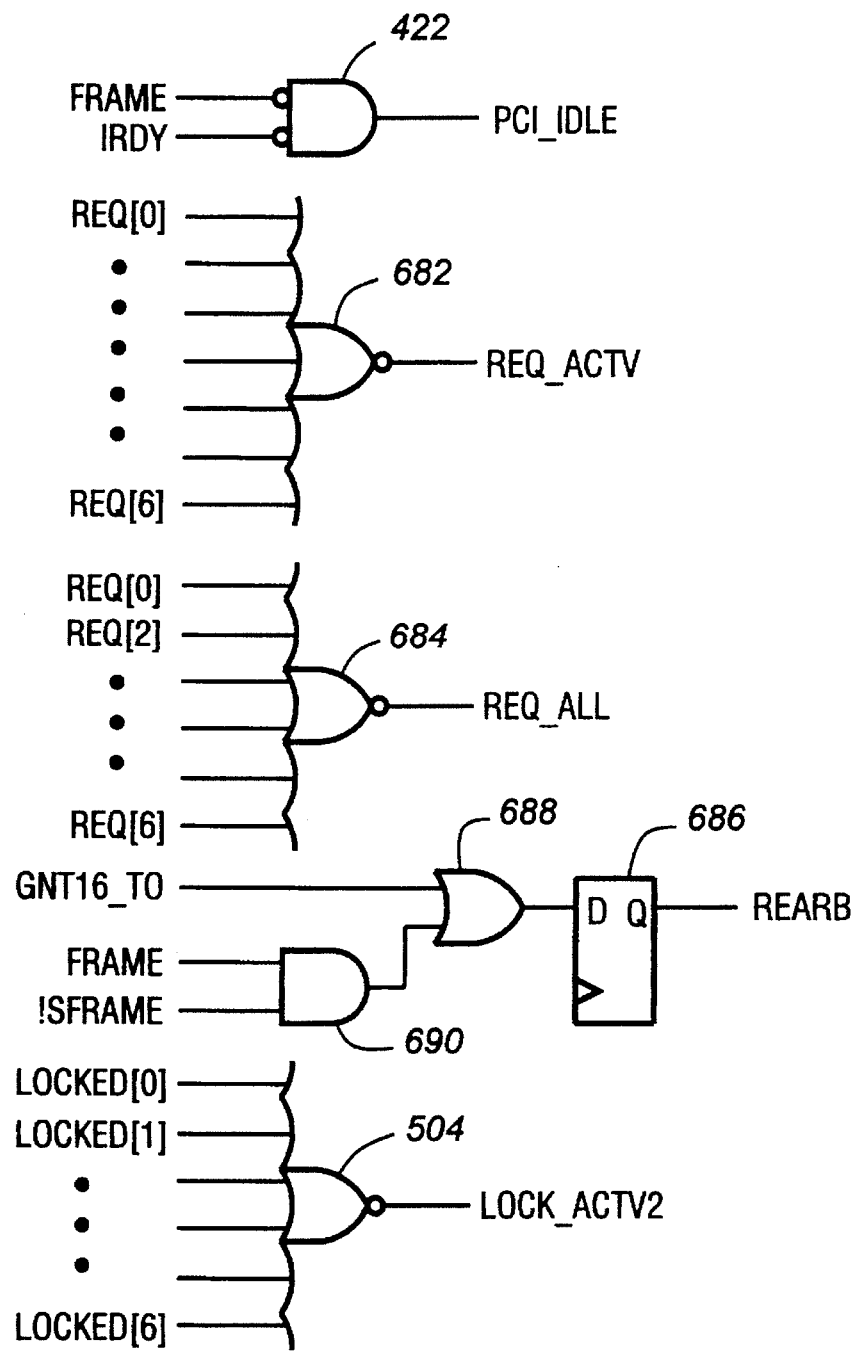

Referring now to FIG. 5, the reservation and mask logic 406 is illustrated. The status decode block 404 receives the PCI status signals and provides four signals, the SET_OWNER, CLR_OWNER, SET_LOCK and CLR_LOCK signals. Development of these signals is shown in FIG. 6. A signal referred to as the FRAME signal is provided as one input to a two input AND gate 420. The second input is the !SFRAME signal or inverted version of a synchronized version of the FRAME signal. The output of the AND gate 420 is the SET_OWNER signal. A signal referred to as PCI_IDLE is the CLR_OWNER signal. The PCI_IDLE signal is provided as the output to a two input NOR gate 422 (FIG. 14), whose inputs are the FRAME and IRDY signals from the PCI bus P. The SET_LOCK signal is provided as the output of a three input AND gate 424, whose inputs are the IRDY signal, the TRDY signal and the PCILOCK signal. The CLR_LOCK signal is provided at the output of a two input AND gate 426 whose inputs are the !FRAME or inverted FRAME signal and the inverted PCILOCK or inverted one PCICLK signal delayed PCI LOCK signal.

The SGNT[6:0] signals and the SET OWNER and CLR_OWNER signals are provided as inputs to a bus owner detect logic 428. The bus owner detect logic 428 is used to provide a series of latched output signals referred to as OWNER[6:0], which refer to the owner of the PCI bus P. Detailed logic in the bus owner detect circuitry 428 is illustrated in FIG. 6. The SET_OWNER signal is provided as one input to a two input NAND gate 430, whose second input receives the SGNT[x] signal, that is, the SGNT signal for the particular or x master. Only one example or channel of the logic is illustrated, the remaining portions being duplicated. This illustration of a single channel for exemplary purposes is utilized whenever possible in this description. The output of the NAND gate 430 is provided as one input to a two input NOR gate 432, whose second input receives the CLR_OWNER signal. The output of the NOR gate 432 is provided to the D input of a D-type flip-flop 434, which receives the PCI_RESET signal, that is the reset signal on the PCI bus P, at its clear input and produces the OWNER[x] signal at its noninverting output. The flip-flop 434 is clocked by the PCICLK signal. It is noted in FIG. 6 that no connection is shown to the clock input of the flip-flop 434 and this is used uniformally throughout the Figures to indicate that the clocking input is the PCICLK signal. Where it is otherwise, a signal is provided to the clocking input of the particular flip-flop. The various PCICLK signal connections to the flip-flops have been omitted for clarity.

The OWNER[6:0], SET_LOCK and CLR_LOCK signals are provided as inputs to lock owner detect logic 436. The output of the lock owner detect logic 436 is the LOCKED[6:0] signals. Detailed development of the lock owner detect circuitry 436 is illustrated in FIG. 6. The OWNER[x] signal is provided as one input to a three input NAND gate 438. The second input to the NAND gate 438 is the SET_LOCK signal, while the third input is the !LOCK_ACTV or not lock active signal. The !LOCK_ACTV signal is produced at the output of a seven input NOR gate 440, with each of the LOCKED[6:0] signals being the seven inputs to the NOR gate 440. The output of the NAND gate 438 is provided as one input to a two input NOR gate 442, whose second input receives the CLR_LOCK signal. The output of the NOR gate 442 is provided to the D input of a D-type flip-flop 444, which is cleared by the PCI_RESET signal. The noninverting output of the flip-flop 444 is the LOCKED[x] signal, while the inverted output provides the !LOCKED[x] signal.

The PCI status signals are also provided to a RETRY FLAG state machine 450. The RETRY FLAG state machine is clocked by the PCICLK signal. The outputs of the RETRY FLAG state machine are the RETRY_MSTR signal, the CUT_RETRY_MSTR signal and the CPU_RETRY_MSTR signal. The CUT_RETRY_MSTR signal is used to indicate that a retry has been issued by the PCI to EISA bridge 130 and that the cycle which has been aborted was addressed to either the bridge 130 itself or to the EISA bus E. The conditions of this retry are further described below. The CPU_MSTR signal indicates that the processor/main memory initiated the retry of the particular cycle. The CUT_RETRY_MSTR signal is used to mask off the bus request of the particular master which was retried until the cycle can be retried without a need for a further retry, while the CPU_RETRY_MSTR signal is used to mask off all but the processor/main memory from the next arbitration cycle, so that it effectively has highest priority.

Figure 7:
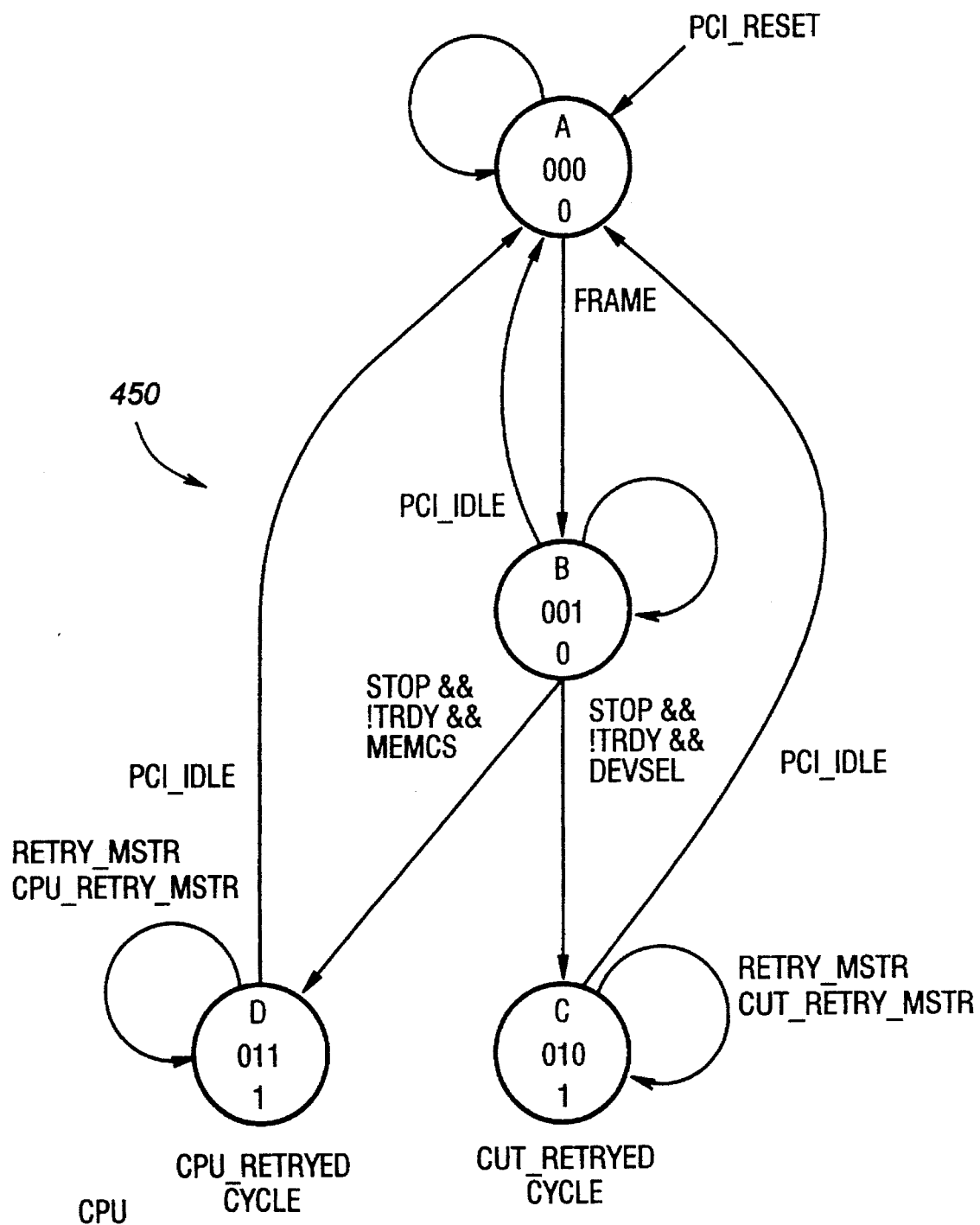
FIG. 7 is a state machine for tracking cycles to indicate when a retry has occurred to prevent reprioritization.

The RETRY FLAG state machine 450 is illustrated in FIG. 7. Operation of the state machine commences at state A upon receipt of the PCI_RESET signal. When the FRAME signal is asserted, control proceeds to state B. Otherwise control remains at state A. If the PCI_IDLE signal is asserted in state B, control returns to state A. If the STOP signal in the PCI bus P is asserted, the TRDY signal is not asserted and the MEMCS or memory chip select signal is asserted, control proceeds to state D. This is an indication that an operation directed to memory, i.e. the processor card, has been detected and is to be retried. If the STOP signal is asserted, as well as a DEVSEL or device select signal which indicates that the EISA bus E or other portions of the PCI-EISA bridge 130 has been selected, and the TRDY signal is not asserted, control proceeds to step C. This is an indication that the PCI-EISA bridge 130 has indicated that the cycle is to be retried. Otherwise control remains at state B. Control proceeds from state D to state A upon assertion of the PCI_IDLE signal and otherwise remains in state D. During state D the RETRY_MSTR and CPU_RETRY_MSTR signals are asserted. Control proceeds from state C to state A when the PCI_IDLE signal is asserted. While the state machine is in state C the RETRY_MSTR and CUT_RETRY_MSTR signals are asserted. Thus the state machine 450 indicates when a cycle has been retried and whether it was directed to the processor, that is the main memory, or to the EISA bus E or a device under control of the PCI-EISA bridge 130.

The OWNER[6:0] and LOCKED[6:0] signals and the CUT_RETRY_MSTR signal are provided to the CUT mask generation logic 452, which also receives a signal referred to as the CUT_RETRY_MSK_EN or cut retry mask enable signal from a bit in an arbitrary I/O port. This bit is used to enable or disable operation of the feature wherein the bus request signal of a requesting bus master which has been retried based on an access to the PCI-EISA bridge 130 is masked until the cycle can be completed without a further retry. When this feature is disabled, which is not preferable, then the master may repeatedly retry prior to the data being available. The output of the CUT mask generation logic 452 is the CUT_MSK[6:0] signals. Further details of the logic are provided in FIG. 6. The OWNER[x] and !LOCKED[x] signals are the inputs to a two input AND gate 454. The output of the AND gate 454 is connected to the D input of a D-type flip-flop 456. The non-inverted output of the flip-flop 456 is the CUT_MSK[x] signal. The clocking signal to the flip-flop 456 is provided by the output of a two input OR gate 458 which receives the CUT_RETRY_MSTR signal at one input and the output of a three input OR gate 460 at its second input. The output of the OR gate 460 is also provided to the clear input of the flip-flop 456. The OR gate 460 receives the PCI_RESET, !RETRY and !CUT_RETRY_MSK_EN signals. The RETRY signal is provided under several conditions. First, a cycle is directed to the EISA bus E, but another cycle is already in progress on the EISA bus E. One example is when a prior master has posted a write operation to the EISA bus E and that write operation is occurring. Second, a cycle is directed to the EISA bus E when a refresh cycle on the EISA bus E is pending or is in progress. The third condition is when the PCI-EISA bridge 130 is the responding PCI slave, a lock has been set and the requesting bus master is not the locking bus master. This condition occurs as the PCI-EISA bridge 130 must not execute a cycle as a locked resource to any master except the one placing the lock. The RETRY signal is asserted when any of these events occur and is removed or negated when the assertion event is completed, such as the lock being released, the posted write completing or the refresh completing. The PCI-EISA bridge 130 can obviously determine when it is unlocked and can determine the other two events as it is performing the posted write operation and it includes the refresh controller. Therefore if a cycle directed to the PCI-EISA bridge 130 is retried, and the PCI-EISA bridge 130 is not locked, then the CUT_MSK bit is set to allow this master's bus request to be masked until the retry source event is completed.

As mentioned above, there are certain conditions when a PCI master is retried when referencing the memory. Then it is desirable to mask off all of the other request lines other than the one from the processor/main memory. It is desirable that this period be programmable because of varying processor speeds and other variables. To this end, two bits are utilized to define four options. The 00 value indicates that masking is disabled, while the other three combinations refer to 4, 6 and 8 PCICLK signal delays. These bits are provided to a CPU timer 470, with the CPU timer 470 being clocked by the PCICLK signal. The timer 470 is started upon receipt of a signal which is provided by the output of a five input AND gate 472. The inputs to the AND gate 472 are the GNT[0] signal, the PCI_IDLE signal, the CPU_MSK[1] signal, the !CNTR_ACTV signal and the !COUNT_DIS-ABLED signal. So when the timer 470 is not disabled, and not active, the PCI bus P is idle because of the retry, the EISA bus E is masked and the PCI bus P has been granted to the CPU, then the timer 470 is started by loading in the value indicated by the two bits and counts down from the loaded value. The timer 470 is reset by the output of a two input OR gate 474. One input to the OR gate 474 is the PCI_RESET signal and the other input is provided by the non-inverting output of a D-type flip-flop 476. The D input of the flip-flop 476 receives the output of a two input NOR gate 478 which receives at its inputs the two bits to define the time interval. The inverting output of the flip-flop 476 is the !COUNT_DISABLED signal. The timer 470 is preferably a three bit timer and the three output bits are provided as three inputs to a three input NOR gate 480 whose output is the !CNTR_ACTV signal. The final output of the timer 470 is the CPU_TO or CPU timeout signal which is provided when the timer 470 has counted down to 0 from the loaded value.

The CPU_RETRY_MSTR, CPU_TO and !COUNT_DISABLED signals are provided to the CPU mask generation logic 482, which provides the CPU_MSK[6:1] signals. It is noted that a 0 signal is not provided as the CPU itself is not masked as it is intended to be the priority device. Details of the CPU mask generation logic 482 are provided in FIG. 6. The CPU_RETRY_MSTR signal is provided as one input to a two input NAND gate 484, with the other input receiving the !COUNT_DISABLED signal. The output of the NAND gate 484 is provided as one input to a two input NOR gate 486 with the second input receiving the CPU_TO signal. The output of the NOR gate 486 is provided to the D input of a D-type flip-flop 488 whose non-inverted output provides the CPU_MSK[x] signal. The flip-flop 488 is reset by the PCI_RESET signal. Thus the CPU_MSK[6:1] signals are set when the CPU_RETRY_MSTR signal is provided and cleared when the CPU_TO signal is provided.

The CUT_MSK[6:0] and CPU_MSK[6:1] signals are provided to mask generation logic 490. The output of the mask generation logic 490 is the MASK[6:0] signals to indicate which bus request signals are to be masked from the actual prioritization process. Details of the circuitry are provided in FIG. 6. The CUT_MSK[x] and CPU_MSK[x] signals are provided as the two inputs to a two input OR gate 492 whose output is the MASK[x] signal. It is noted that a CPU_MSK[0] signal is not provided so that the MASK[0] signal is simply the CUT_MSK[0] signal.

Figure 8:
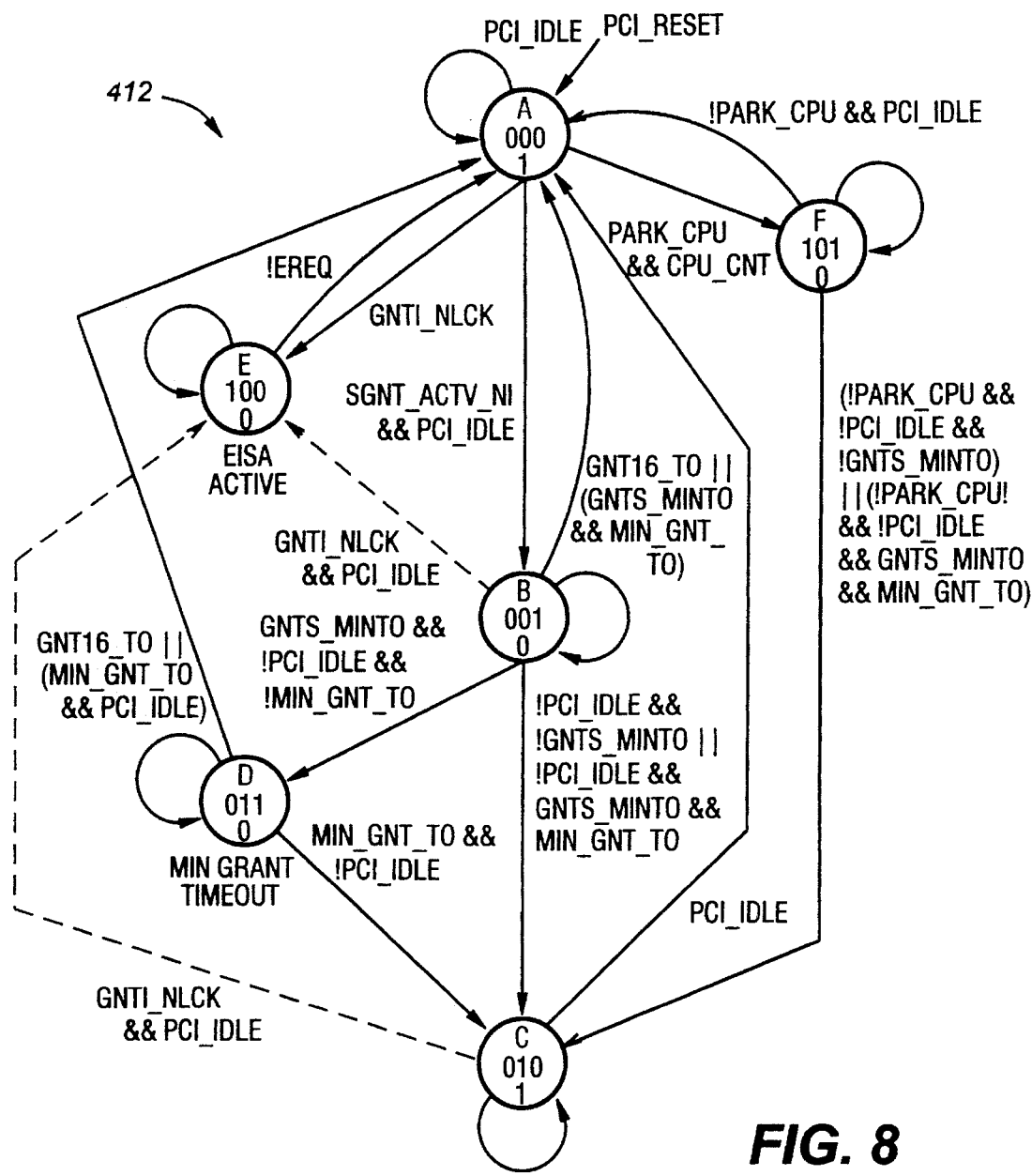
FIG. 8 is a state machine for determining when a new master has been granted the bus.
Figure 13:
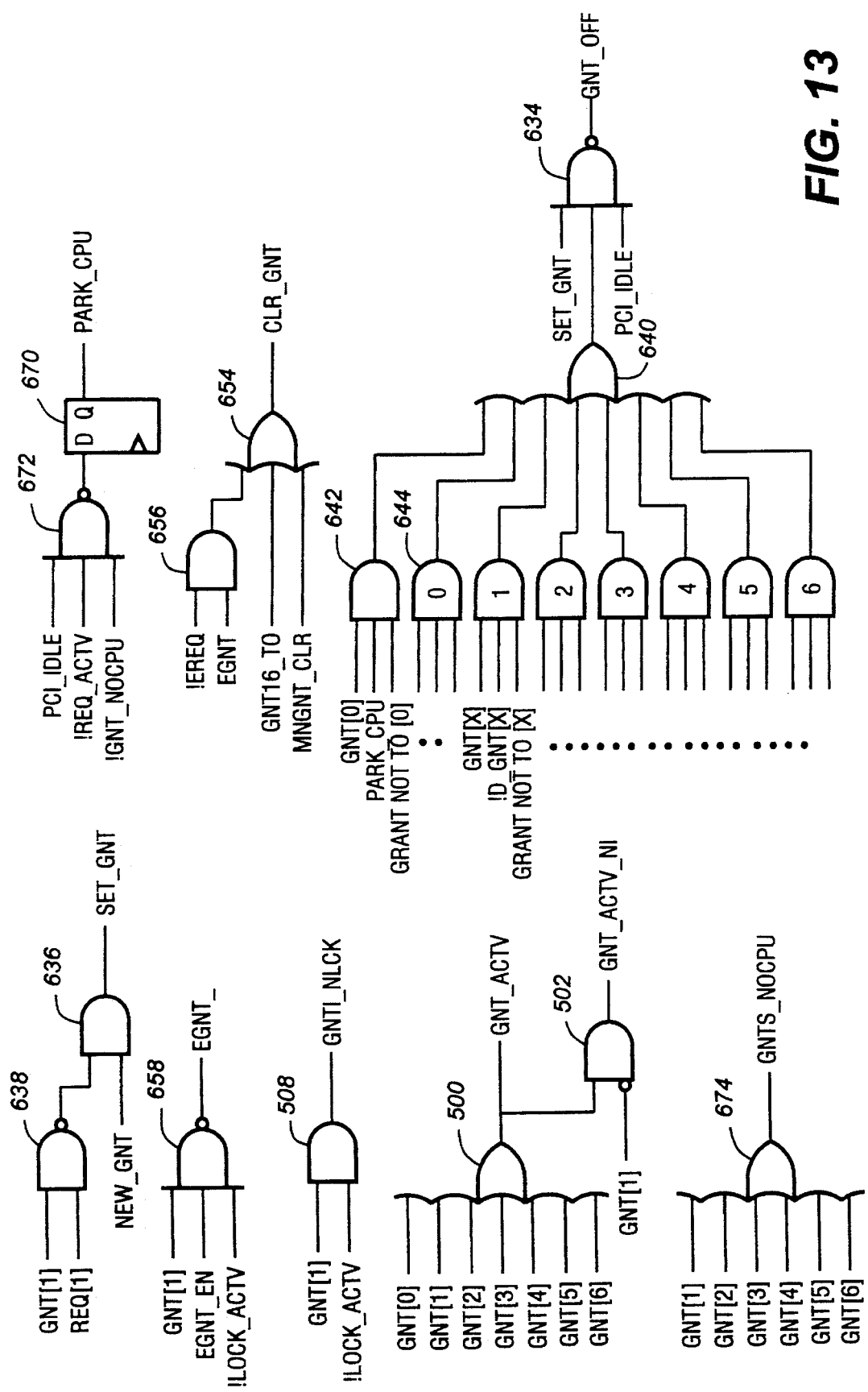

The operation of the new grant state machine 412 is illustrated in FIG. 8. Control begins at state A upon receipt of the PCI_RESET signal. If there is an active grant as indicated by the GNT_ACTV signal, control proceeds to state B. The GNT_ACTV signal is produced as a seven input OR gate 500 (FIG. 13). The seven inputs to the OR gate 500 are the GNT[6:0] signals. The GNT_ACTV signal is also provided as one input to a two input AND gate 502, whose other input is inverted and receives the GNT[1] signal. The output of the AND gate 502 is the GNT_ACTV_N1 or grant active except for EISA signal. The SGNT_ACTV_N1 signal is the synchronized version of the GNT_ACTV_N1 signal. Thus, when the signal SGNT_ACTV_N1 and the signal PCI_IDLE are asserted, the state machine transitions from state A to state B. Control proceeds from state A to state E if the GNT1_NLCK signal is present, indicating that the EISA bus E has control of the PCI bus P and no lock signal is active, as indicated by the LOCK_ACTV2 signal. The GNT1_NLCK signal is provided as the output of a two input AND gate 508 (FIG. 13). The inputs to the AND gate 508 are the GNT[1] signal and the !LOCK_ACTV2 signal. The LOCK_ACTV2 signal is produced as the output of a six input OR gate 504 whose inputs are the LOCKED[0, 2:6] signals. Control proceeds from state A to state F if the PARK_CPU signal is asserted and the CPU_GNT or GNT[0] signal is asserted. PARK_CPU is an indication that no one has requested the bus and therefore the CPU is given priority as the default owner. In all other cases, control remains at state A.

Control proceeds from state E to state A when the !EREQ signal is true, that is, when the EISA request signal is not present. Otherwise, control remains at state E. Thus, once the EISA bus E has gained ownership of the PCI bus P, it remains there until its operation is completed. Control proceeds from state B back to state A if the GNT16_TO signal is true or if the GNTS_MINTO and MIN_GNT_TO signals are true. As indicated above, the GNT16_TO signal indicates that 16 PCICLK cycles have elapsed without activity on the bus, while the GNTS_MINTO and MIN_GNT_TO signal term indicates that certain masters having minimum grant times have control of the bus and the minimum grant time has timed out. Control proceeds from state B to state D when the GNTS_MINTO signal is true, the PCI_IDLE signal is not asserted and the MIN_GNT_TO signal is not asserted. This is an indication that the minimum grant time has not expired and the bus master is active on the bus so that no grants are disabled. Control proceeds from state B to state C when the !PCI_IDLE signal is true and the !GNTS_MINTO signal is true or if it is not a PCI_IDLE condition and the GNTS_MINTO and MIN_GNT_TO signals are asserted. This indicates that the bus is active and it has either timed out or is not subject to a minimum grant time. In a case which should not normally occur, control proceeds from state B to state E when the GNT1_NLCK and PCI_IDLE signals are asserted. Otherwise control remains at state B.

Control proceeds from state D back to state A if the GNT16_TO signal is true or if the MIN_GNT_TO signal is true and the PCI_IDLE signal is true, indicating either a period of sufficient inactivity without a bus master taking control of the bus or the minimum grant time has expired and the bus is idle. Control proceeds from state D to state C if the MIN_GNT_TO signal is true and the bus is not idle, as indicated by the !PCI_IDLE signal. This is a case when the bus master is still active after the minimum grant time. Otherwise control remains at state D. Thus an exit from state D indicates that all of the minimum grant time outs have elapsed.

Control proceeds from state C to state A when the PCI_IDLE signal is asserted, indicating that the PCI bus P is idle. Control proceeds from state C to state E in the improper condition where the GNT1_NLCK and PCI_IDLE signals are asserted. Otherwise control remains at state C.

Control proceeds from state F back to state A if the !PARK_CPU signal is asserted and the bus is idle. Control proceeds from state F to state C under numerous conditions, the first of which is that the !PARK_CPU signal is true, the !PCI_IDLE signal is true and the !GNTS_MINTO signal is true. This term is used when the CPU is not to be the default master, the bus is not idle and a bus master with a minimum grant time is not in control. The second condition for the transfer is if the !PARK_CPU signal is true, the !PCI_IDLE signal is true, the GNTS_MINTO signal is true and the MIN_GNT_TO signal is true, indicating that the minimum grant time has elapsed and the bus is not idle. In all other cases control remains at state F.

Figure 9:
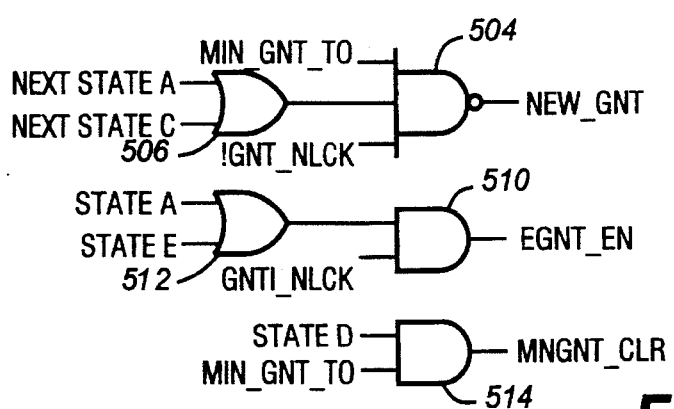
FIG. 9 is a schematic diagram of logic associated with the state machine of FIG. 8.

FIG. 9 illustrates the outputs of the new grant state machine 412. The NEW_GNT signal is provided as the output of a three input NAND gate 504. The MIN_GNT_TO signal and the !GNT1_NLCK signals are two inputs to the NAND gate 504, while the third input is provided by the output of a two input OR gate 506. The inputs to the OR gate 506 are signals that indicate that the next state of the state machine 412 will be state A or state C. Thus the NEW_GNT signal is active when either the bus has gone idle or the minimum grant time, if any, has elapsed. The EGNT_EN or EISA grant enable signal is provided as the output of a two input AND gate 510, one of which inputs receives the GNT1_NLCK signal. The remaining input is provided by the output of a two input OR gate 512 whose inputs indicate that the state machine is in state A or state E. Thus the EGNT_EN signal is active when either the bus has been idle or the EISA bus E is in control and the signal GNT1_NLCK is asserted. The final output of the new grant state machine 412 is the MNGNT_CLR signal, which is provided as the output of a two input AND gate 514 whose inputs are a signal that indicates that the state machine is in state D and the MIN_GNT_TO signal.

The minimum grant timer 414 is designed so that particular devices, in the preferred embodiment, particularly the CPU, the device in the option connector 118, the graphics controller and a further device, can have certain minimum grant or bus access times to allow them to do at least certain minimal operations. This is in contrast and different from the GNT_TO timer 416, which is used to determine if a device has not responded within the first 16 PCICLKs after receiving the PCI bus P, in which case mastership is transferred. The MIN_GNT timer logic 414 assures that once the particular device obtains the bus, it has it for a minimum number of PCICLK cycles. To this end sixteen data bits are provided to the timer 414 to specify the minimum times for the four particular devices in the preferred embodiment. When the minimum grant timer 414 is started, this time value is loaded into a countdown timer which then counts down to zero.

Figure 10:
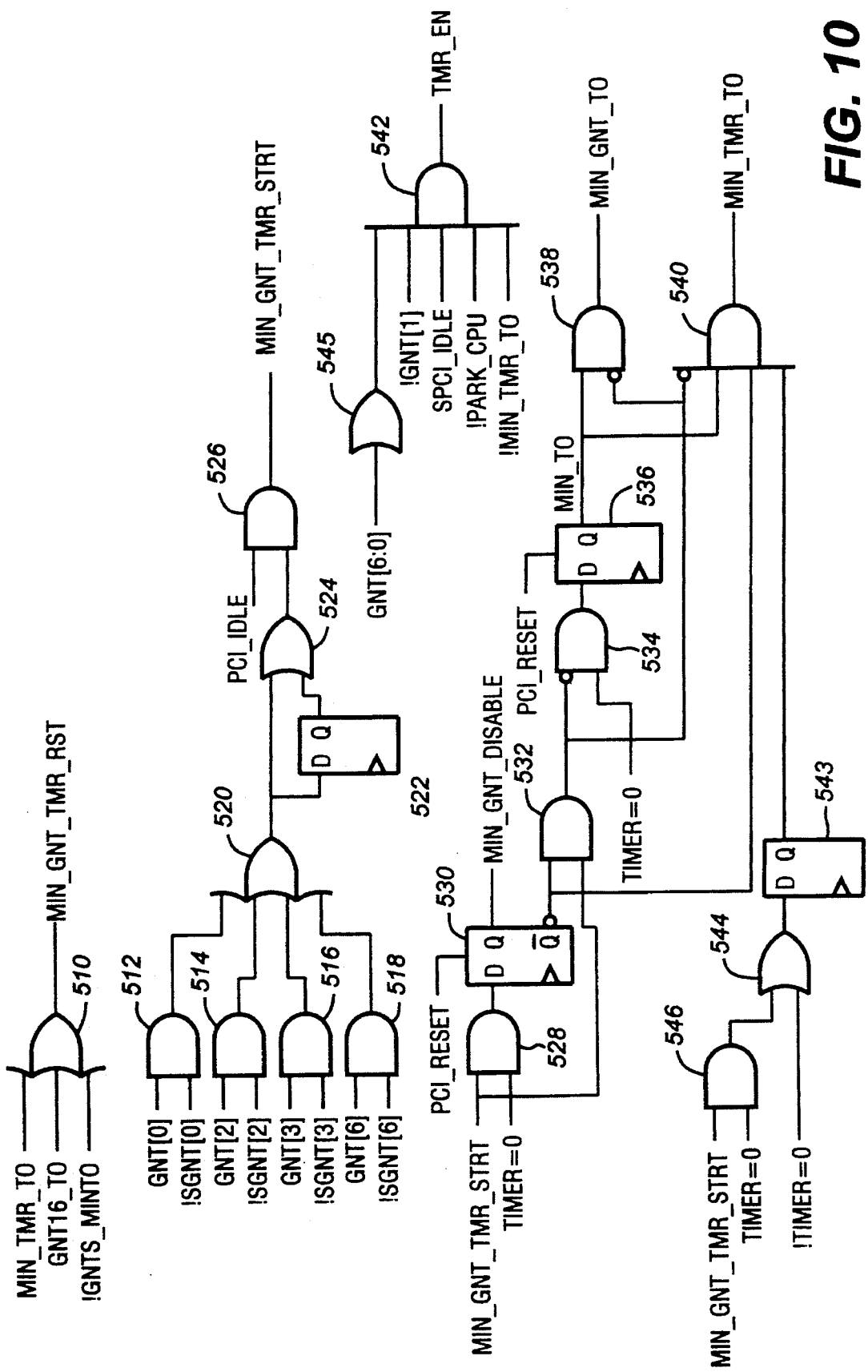
FIG. 10 is a schematic diagram of logic and circuitry associated with minimum grant timer of FIG. 4.

Referring now to FIG. 10, the timer 414, which is clocked by the PCICLK signal, receives a signal referred to as MIN_GNT_TM_RST or minimum grant timer reset. This signal is provided as the output to a three input OR gate 510. The three inputs to the OR gate are the MIN_TMR_TO signal, which is actually an output of the minimum grant timer 414; the GNT16_TO signal, to indicate that the initial idle bus timer has elapsed; and the !GNTS_MINTO signal. When this signal is high, the minimum grant timer 414 is reset. The MIN_GNT_TMR_STRT signal is used to start the timer 414. To this end the GNT[0] and !SGNT[0] signals are provided to a two input AND gate 512. Similarly, the GNT and !SGNT signals for bus masters 2, 3 and 6 are provided to AND gates 514, 516 and 518. The outputs of the AND gates 512, 514, 516 and 518 are the inputs to a four input OR gate 520, whose output is provided to a D-type flip-flop 522 and to one input of a two input OR gate 524. The non-inverting output of the flip-flop 522 is provided as the second input to the OR gate 524. The output of the OR gate 524 is provided to one input of a two input AND gate 526, whose other input receives the PCI_IDLE signal. The output of the AND gate 526 is the MIN_GNT_TMR_STRT signal. Thus the timer 414 is started when the PCI bus P is idle and a grant has been provided to one of the appropriate bus masters.

The MIN_GNT_TMR_STRT signal is provided to one input of a two input AND gate 528. The second input of the AND gate 528 receives an indication that the timer 414 has counted down to 0, that is, the minimum grant time for the particular device has elapsed. The output of the AND gate 528 is provided to the D input of a D-type flip-flop 530, whose preset input is connected to the PCI_RESET signal. The non-inverting output of the flip-flop 530 is the MIN_GNT_DISABLE signal, which is used to stop the timer 414. The inverted output of the flip-flop 530 is connected to one input of a two input AND gate 532, with the other input receiving the MIN_GNT_TMR_STRT signal. The output of the AND gate 532 is provided to an inverted input of a two input AND gate 534, with the other input receiving the signal indicating that the timer 414 has counted down to 0. The output of the AND gate 534 is provided to the D input of a D-type flip-flop 536, with the PCI_RESET signal being provided to the preset input. The output of the flip-flop 536 is the MIN_TO or minimum timeout signal, which is provided to one input of a two input AND gate 538 and to one input of a four input AND gate 540. The second input to the AND gate 538 is inverted and is connected to the output of the AND gate 532. Similarly, the output of the AND gate 532 is connected to an inverted input of the AND gate 540. The inverted output of the flip-flop 530 is connected to the third input of the AND gate 540, while the non-inverted output of a D-type flip-flop 543 is connected to the fourth input of the flip-flop 540. The D input of the flip-flop 543 receives the output of an OR gate 544, whose inputs are the !TIMER=0 signal, which indicates that the timer has not counted down to zero after being loaded, and the output of a two input AND gate 546, whose inputs are the MIN__GNT_TMR__STRT signal and the TIMER=0 signal. The output of the AND gate 538 is the MIN__GNT__TO signal while the output of the AND gate 540 is the MIN_TMR_TO signal. Thus in this manner when the MIN_GNT_TMR__STRT signal is received, the timer 414 is loaded with the proper value and commences counting down operations. This continues until the timer 414 reaches zero, at which time the MIN__GNT_TO signal and the MIN_TMR_ TO signal are asserted to indicate a timeout.

It has been noted that the grant time out timer 416 counts a 16 PCICLK period after a bus master obtains control of the PCI bus P. The timer 416 is enabled by the output of a five input AND gate 542. Four of the inputs to the AND gate 542 are the !GNT_[1] signal; the SPCI_IDLE signal, which is the synchronized version of the PCI_IDLE signal; the !PARK_CPU signal, and the !MIN_TMR_TO signal. The fifth input is provided by the output of a seven input NAND gate 545 which receives the seven GNT signals. Thus the timer 416 is activated by AND gate 542 when any of the bus masters has been granted the bus, except for the EISA bus E acting as master, and the PCI bus P has been idle but not by default to the CPU. The timer 416 then counts for 16 PCICLK periods and then issues the GNT16_TO signal to indicate that it has timed out.

Figure 11:
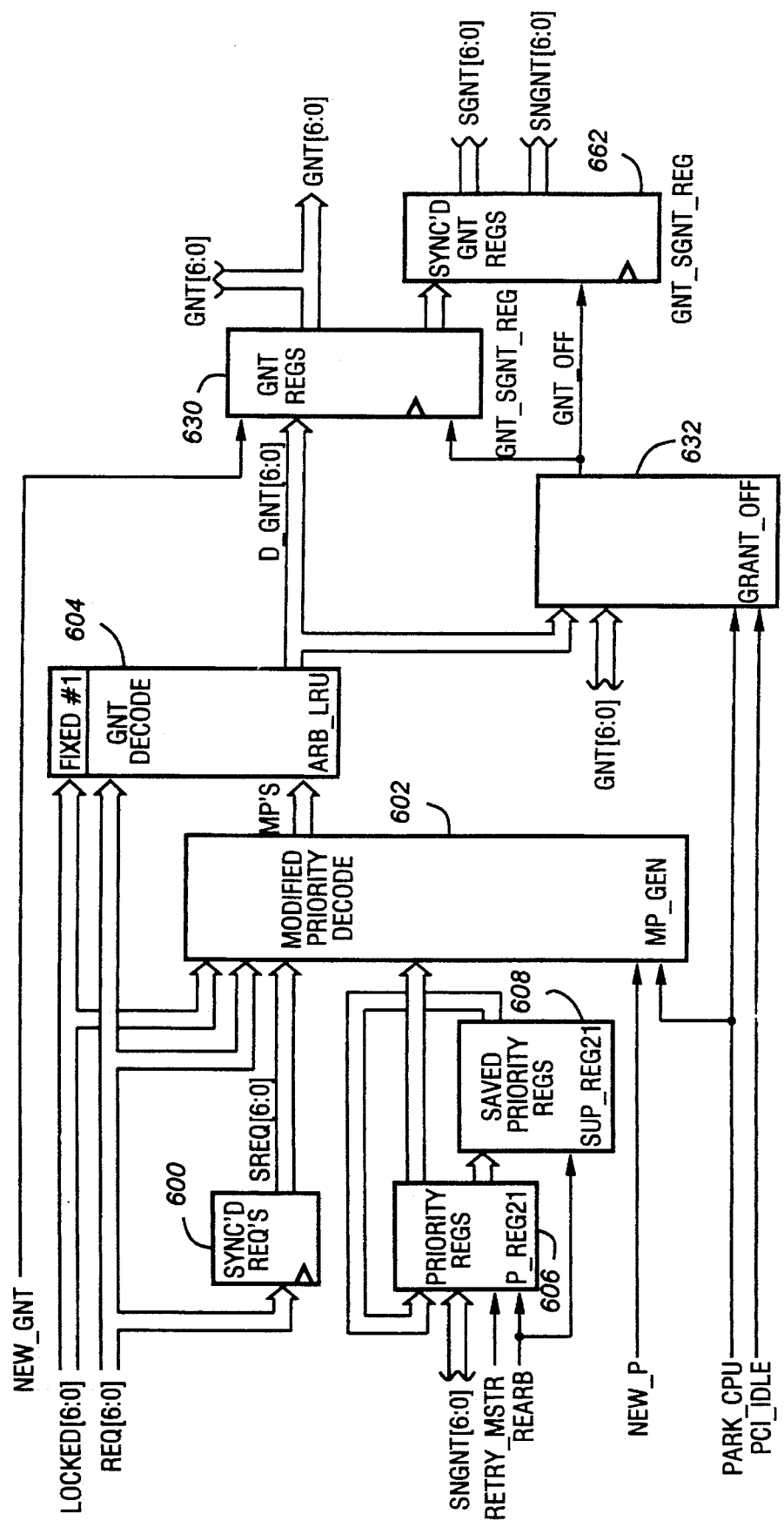
FIG. 11 is a block diagram of the modified LRU arbiter of FIG. 4.

FIG. 11 shows a more detailed block diagram of the LRU type arbiter logic 402. The REQ[6:0] signals are provided to a series of seven D-type flip-flops 600, which synchronize the REQ signals to produce the SREQ[6:0] signals. Additionally, the REQ[6:0] signals are provided to the modified priority decoder 602 and to the actual grant decoder or arbiter 604. The SREQ[6:0] signals are provided to the modified priority decoder 602. Further, the LOCKED[6:0] signals are provided to both the grant decoder 604 and the modified priority decoder 602.

A series of priority registers 606 are used to determine the particular priority of the various masters with respect to each other. To this end the SNGNT[6:0] signals, the synchronized and negative edge stored GNT signals, are provided to priority registers 606, as are the RETRY_MSTR and REARB signals. In addition, the output of saved priority registers 608 is provided to the priority registers 606. The output of the priority registers 606 are provided to the saved priority registers 608 and to the modified priority decode logic 602. The modified priority logic 602 also receives the PARK__CPU signal to be utilized when no master is requesting the PCI bus P.

Figure 12:
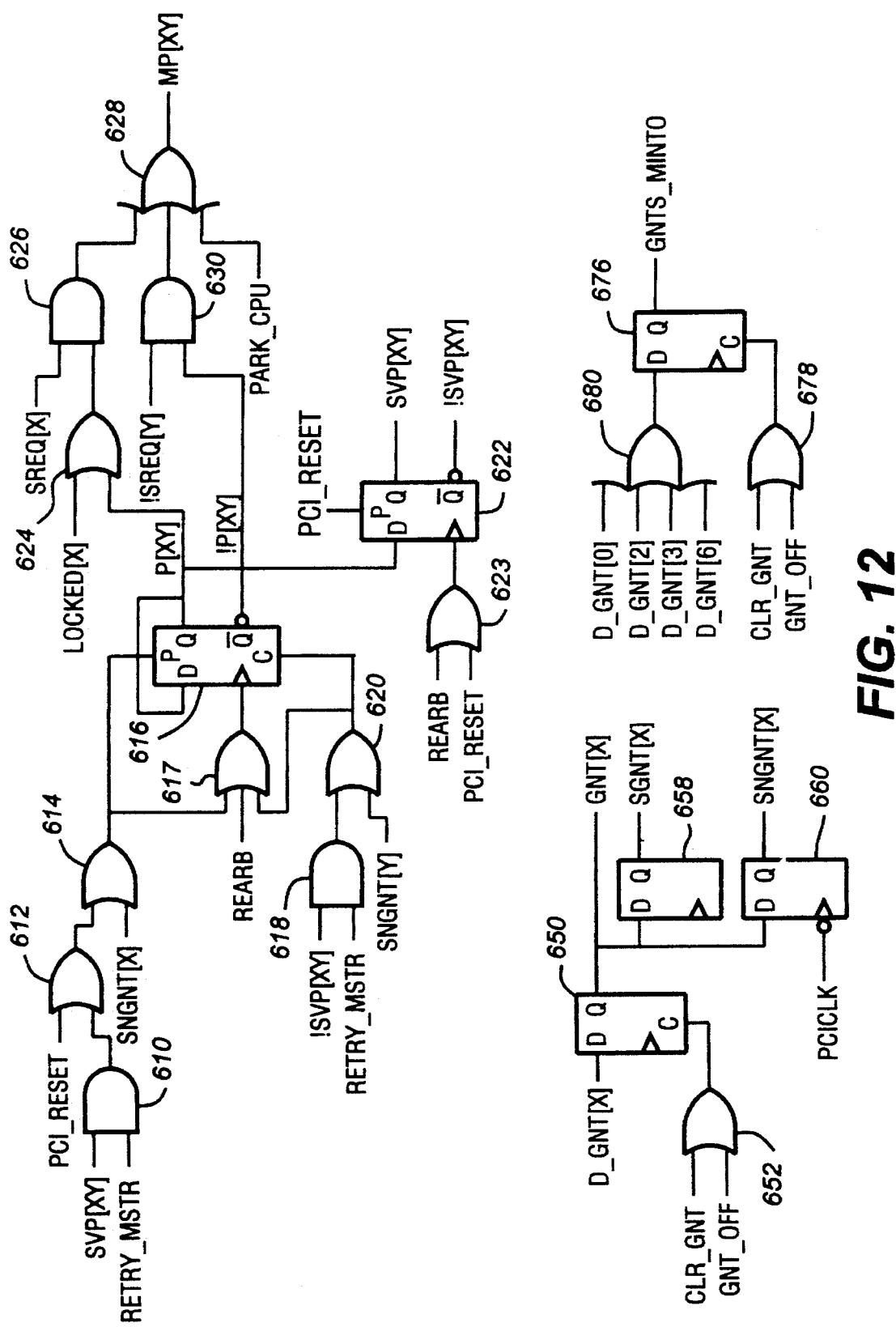
FIGS. 12, 13 and 14 are schematic diagrams of circuitry associated with the arbiter of FIG. 11.

A more detailed schematic of modified priority decode logic 602 and priority and saved priority registers 606 and 608 is provided in FIG. 12. It is noted that 21 bits are stored by the priority register 606 and the saved priority register 608. This corresponds to 1 bit for each combination of bus masters. As an example, 1 bit is provided for bus master 0 versus bus master 6, one for bus master 0 versus bus master 5 and so. In the following discussion this is referred to as bits X and Y with X being the first bus master and Y being the second bus master in the particular stored bit.

The SVP[XY] or saved priority [XY] signal is provided as one input to a two input AND gate 610. The other input is the RETRY_MSTR signal. The output of the AND gate 610 is provided as one input to a two input OR gate 612, whose other input is the PCI_RESET signal. The output of the OR gate 612 is provided as one input to an OR gate 614, whose other input is the SNGNT[X] signal. The output of the OR gate 614 is provided to the preset input of a D-type flip-flop 616. The !SVP[XY] signal is provided as one input to a two input AND gate 618, with the other input receiving the RETRY_MSTR signal. The output of the AND gate 618 is provided as one input to a two input OR gate 620, whose other input receives the SNGNT[Y] signal. The output of the OR gate 620 is provided to the clear input of the flip-flop 616. It is noted that the preset and clear inputs of the flip-flop 616 are synchronous. The clocking signal to the flip-flop 616 is provided by the output of an OR gate 617 which receives the REARB signal and the outputs of the OR gates 614 and 620 as inputs. The non-inverted output of the flip-flop 616 is the P[XY] or priority XY bit and this is provided to the D input of the flip-flop 616 and to the D input of a D-type flip-flop 622. The PCI_RESET signal is provided to the preset input of the D-type flip-flop 622. The non-inverting output of the flip-flop 622 is the SVP[XY] signal, while the inverted output provides the !SVP[XY] signal. The flip-flop 622 is clocked by the output of an OR gate 623, whose inputs are the REARB and PCI_RESET signals. The P[XY] signal is also provided as one input to a two input OR gate 624, with the second input being the LOCKED[X] signal. The output of the OR gate 624 is provided to a two input AND gate 626, whose second input is the SREQ[X] signal. The output of the AND gate 626 is one input to an OR gate 628, whose output is the MP[XY] or modified priority XY signal. The !P[XY] signal is provided as one input to a two input AND gate 630, whose other input is the !SREQ[Y] signal. It is noted that the REQ[1] and !REQ[1] signals are utilized in the 1 or EISA channel, instead of the SREQ[1] and !SREQ[1] signals. The output of the AND gate 630 is the second input to the OR gate 628. The third input to the OR gate 628 is the PARK_CPU signal, in the case of the channels including the CPU and is not utilized in other channels.

In this manner, when a master is retried the saved priority bit is saved in the flip-flop 616, but if not retried, the master loses priority with respect to all masters. Therefore, should a master have to be retried, it retains its priority with regard to all other masters, so it can have priority access to regain the bus upon its next request. However, if it is not being retried, then priority is flipped with respect to its other master. The modified priority decode logic 602, detailed in AND and OR gates 624, 626, 628 and 630, is utilized to allow only requesting masters to enter the arbitration. If for instance, a master has lower absolute priority, i.e. has been used more recently then another master, but that second master is not requesting the bus, the effective priority utilized in the arbitration is flipped, so that the requesting master has priority over all non-requesting masters.

The equations for the grant decode logic 604 are shown below.

| | |
|---|---|
| CPU_REQ = | SREQ0 ¦ ¦ PARK_CPU |
| D_GNT[0] = | MP01 && MP02 && MP03 && MP04 && MP05 && MP06 && (!LOCK_REQ_ACTV ¦ ¦ LOCKED[0]) && CPU_REQ |
| D_GNT[1] = | MP12 && MP13 && MP14 && MP15 && MP16 && (!MP01 && !LOCK_REQ_ACTV ¦ ¦ LOCKED[1]) && REQ[1] |
| D_GNT[2] = | MP23 && MP24 && MP25 && MP26 && (!MP02 && !MP12 && !LOCK_REQ_ACTV ¦ ¦ LOCKED[2]) && SREQ[2] |
| D_GNT[3] = | MP34 && MP35 && MP36 && (!MP03 && !MP13 && !MP23 && |

-continued

```
           !LOCK REQ ACTV ¦¦ LOCKED[3]) &&
           SREQ[3]
D_GNT[4] = MP45 && MP46 && (!MP04 && !MP14 &&
           !MP24 && !MP34 &&
           !LOCK_REQ_ACTV ¦¦ LOCKED[4]) &&
           SREQ[4]
D_GNT[5] = MP56 && (!MP05 && !MP15 &&
           !MP25 && !MP35 && !MP45 &&
           !LOCK_REQ_ACTV ¦¦ LOCKED[5]) &&
           SREQ[5]
D_GNT[6] = (!MP06 && !MP16 && !MP26 &&
           !MP36 && !MP46 && !MP56 &&
           !LOCK_REQ_ACTV ¦¦ LOCKED[6]) &&
           SREQ[6]
```

It can be seen that the particular grant is provided when all of the modified priority bits point to that particular bus master, that bus master has either locked the bus or no lock requests are active and that master is requesting the bus.

The outputs of the grant decoder 604 are the D_GNT [6:0] signals which are provided to the grant storage registers 630 and to the grant off logic 632. The grant off logic 632 also receives the GNT[6:0] signals as well as the PARK_CPU and PCI_IDLE signals. The grant off logic 632 provides the GNT_OFF signal, which is used to guarantee one PCICLK of dead time between grants. The GNT_OFF logic 632 is shown in more detail in FIG. 13. The GNT_OFF signal is produced as the output of a three input AND gate 634, two of whose inputs are the SET_GNT and PCI_IDLE signals. The SET_GNT signal is produced as the output of a two input AND gate 636, one of whose inputs is the NEW_GNT signal and whose other input receives the output of a two input NAND gate 638. The inputs to the NAND gate 638 are the GNT[1] and REQ[1] signals, indicating that the EISA bus is requesting and has been granted the bus. Thus the SET_GNT signal is provided when a new grant is to occur and the EISA bus has not been the master nor is requesting the bus. The third input to the AND gate 634 is the output of a eight input OR gate 640. The first input to the OR gate 640 is provided by the output of a three input AND gate 642, which receives at its inputs the GNT[0] signal, the PARK_CPU signal and a signal indicating that the grant is not to bus master 0. The seven other inputs of the OR gate 640 are provided by outputs of AND gates 644 and the like which have as inputs the GNT[x], the !D_GNT[x] and grant not to bus master X signals. Thus the GNT_OFF signal is provided to clear the grant register 630 for one PCICLK signal of bus idle when the bus ownership is changing.

The grant registers 630 are shown in more detail in FIG. 12. The D_GNT[x] signal is provided to the D input of a D-type flip-flop 650. The clear input of the flip-flop 650 receives the output of a two input OR gate 652, which at its inputs receives the GNT_OFF signal and the CLR_GNT signal. The CLR_GNT signal is provided as the output of a three input OR gate 654. The inputs to the OR gate 654 are the MNGNT_CLR and GNT16_TO signals and the output of a two input AND gate 656 which receives the !EREQ and EGNT signals. The EGNT_ signal is provided as the output of a three input NAND gate 658 whose inputs are the GNT[1], EGNT_EN and !LOCK_ACTV signals. Thus the CLR_GNT signal is used to clear the grant registers 630 when a bus master, other than the EISA bus E, has not taken control within the 16 PCICLK period. The output of the flip-flop 650 is the GNT[x] signal, which is also provided to the D inputs of D-type flip-flops 658 and 660. The non-inverted output of the flip-flop 658 is the SGNT[x] or synchronized grant signal, while the non-inverted output of the flip-flop 660 produces the SNGNT[x] signal because the flip-flop 660 is clocked on the falling edge of the PCICLK signal. Thus the flip-flops 658 and 660 form the synchronized grant register 662 of FIG. 11.

Certain miscellaneous logic and signals have been discussed in this description and the logic is as follows. The PARK_CPU signal is produced by the non-inverting output of a D-type flip-flop 670. The D-input of the flip-flop 670 is connected to the output of a three input AND gate 672. The inputs to the AND gate 672 are the PCI_IDLE signal, the !REQ_ACTV or inverted request active signal, and the !GNTS_NOCPU signal. The GNTS_NOCPU signal is produced at the output of a six input OR gate 674 which receives at its inputs the GNT[6:1] signals. Thus the PARK_CPU signal is active when the bus has been idle, no requests are active and there are no grants to masters other than the CPU. One signal utilized in the new grant state machine 412 was the GNTS_MINTO signal. This signal is produced at the output of a D-type flip-flop 676 (FIG. 12). The clear input to the flip-flop 676 is provided by the output of a two input OR gate 678, which receives the CLR_GNT and GNT_OFF signals. The D input of the flip-flop 676 is provided by the output of a four input OR gate 680, whose inputs receive the D_GNT[0,2,3,6] signals. These are the particular bus masters which have minimum grant times. The REQ_ACTV or request active signal is produced at the output of a seven input OR gate 682 which receives at its inputs the seven REQ signals. Similarly, the REQ_ALL signal is produced as the output of a six input OR gate 684 which receives at its inputs all of the request signals except for REQ[1] that is the EISA request. The final signal is the REARB signal, which is produced at the non-inverting output of a D-type flip-flop 686 whose D input is connected to the output of a two input OR gate 688. One input to the OR gate 688 is the GNT16_TO signal, while the second input is connected to the output of a two input AND gate 690. The FRAME signal and the !SFRAME signal or inverted, synchronized FRAME signal are provided to the AND gate 690.

Therefore, an arbiter according to the present invention is provided which prevents a master from repeatedly retrying cycles until the cycle is known to be completable and which provides the memory the highest effective priority if it has forced a retry. This change in effective priority is accomplished by masking bus master bus request signals to meet the required terms. Additionally, the retried master retains it priority for the subsequent arbitration in which it participates.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A bus arbiter for a computer system, the computer system having a bus for connection to a plurality of bus masters and bus slaves, each bus master requesting control of the bus by use of a bus request signal and receiving control by use of a grant signal, wherein bus masters may request a lock on a bus slave by using a lock signal, wherein operation cycles of the bus masters can be directed to be retried by the bus slaves and wherein one of the bus slaves provides an indication when a retried cycle can proceed, the bus arbiter comprising:

means connectable to the bus for receiving the bus request signals from the bus masters;

means connectable to the bus for determining when an operation cycle is to be retried and if said operation cycle to be retried was directed to the bus slave which provides the retried cycle can proceed indication;

means for determining the bus request priority of the bus masters with respect to each other;

means connectable to the bus and coupled to said bus request receiving means and said bus request priority determining means for granting control of the bus to the highest priority requesting bus master and providing the proper bus grant signal; and means coupled to said operation cycle retry means and said control granting means for masking the bus request of the retried bus master until the bus slave indicates that the retried cycle can proceed if the bus slave directing a retry to the bus master is the bus slave which provides said indication, unless the retried bus master has locked the bus slave and then the bus request is not masked.

2. The bus arbiter of claim 1, wherein said means for determining the bus request priority utilizes a least recently used priority protocol.

3. The bus arbiter of claim 2, wherein said means for determining the bus request priority retains the prior priority if a bus master is retried.

4. A computer system, comprising:

a bus for connection to a plurality of bus masters and bus slaves, each bus master requesting control of the bus by use of a bus request signal and receiving control by use of a grant signal, wherein bus masters may request a lock on a bus slave by using a lock signal, and wherein operation cycles of the bus masters can be directed to be retried by the bus slaves;

at least one bus master connected to said bus;

at least one bus slave connected to said bus, wherein one of said bus slaves provides an indication when a retried cycle can proceed;

means connected to said bus for receiving the bus request signals;

means connected to said bus for determining when an operation cycle is to be retried and if said operation cycle to be retried was directed to said bus slave which provides the retried cycle can proceed indication;

means for determining the bus request priority of said bus masters with respect to each other;

means connected to said bus and coupled to said bus request receiving means and said bus request priority determining means for granting control of said bus to the highest priority requesting bus master and providing the proper bus grant signal; and means coupled to said operation cycle retry means and said control granting means for masking the bus request of the retried bus master until said bus slave indicates that the retried cycle can proceed if the bus slave directing a retry to the bus master is said bus slave which provides said indication, unless the retried bus master has locked the bus slave and then the bus request is not masked.

5. The computer system of claim 4, wherein said means for determining the bus request priority utilizes a least recently used priority protocol.

6. The computer system of claim 5, wherein said means for determining the bus request priority retains the prior priority if a bus master is retried.

7. A method for bus arbitration of a computer system, the computer system having a bus for connection to a plurality of bus masters and bus slaves, each bus master requesting control of the bus by use of a bus request signal and receiving control by use of a grant signal, wherein bus masters may request a lock on a bus slave by using a lock signal, wherein operation cycles of the bus masters can be directed to be retried by the bus slaves and wherein one of the slaves provides an indication when a retried cycle can proceed, the bus arbitration method comprising the steps of:

receiving the bus request signals from the bus masters;

determining when an operation cycle is to be retried and if said operation cycle to be retried was directed to the bus slave which provides the retried cycle can proceed indication;

determining the bus request priority of the bus masters with respect to each other;

granting control of the bus to the highest priority requesting bus master and providing the proper bus grant signal; and masking the bus request of the retried bus master until the bus slave indicates that the retried cycle can proceed if the bus slave directing a retry to the bus master is the bus slave which provides the indication, unless the retried bus master has locked the bus slave and then the bus request is not masked.

8. The bus arbitration of claim 7, wherein said step of determining the bus request priority utilizes a least recently used priority protocol.

9. The bus arbitration method of claim 8, wherein said step of determining the bus request priority retains the prior priority if a bus master is retried.

* * * * *